May 16, 1950  F. ELIASSEN  2,508,149

SWITCH FOR CLEARANCE INDICATORS

Filed April 6, 1948

INVENTOR.
FRED ELIASSEN
BY
ATTORNEY

Patented May 16, 1950

2,508,149

UNITED STATES PATENT OFFICE 2,508,149

SWITCH FOR CLEARANCE INDICATORS

Fred Eliassen, New York, N. Y.

Application April 6, 1948, Serial No. 19,372

2 Claims. (Cl. 200—52)

This invention relates to a clearance indicator for motor vehicles.

More particularly, the invention relates to clearance indicator for use with a land or water vehicle for indicating when a collision is about to take place.

In one embodiment of the invention, the clearance indicators are designed for use on an automotive vehicle, such as a passenger car or truck, particularly a trailer truck. Each indicator includes a flexible projection which has universal movement and which incorporates electric switch means so that collision with the projection by an abutting force in any direction will give a warning signal. The indicators can also be used, in a similar manner, as clearance indicators or collision indicators on boats, buses, and other vehicles not running on tracks.

An object of the persent invention is to provide a vehicle having the indicators at various points thereon to act as collision indicators.

Another object is to provide a clearance indicator, as above indicated, which incorporates electric switch means and which will close the switch upon any bending of the indicator in response to an abutting force in any direction.

Still further, it is proposed to provide a clearance indicator of the aforesaid type which is of improved construction and which is practically indestructible.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
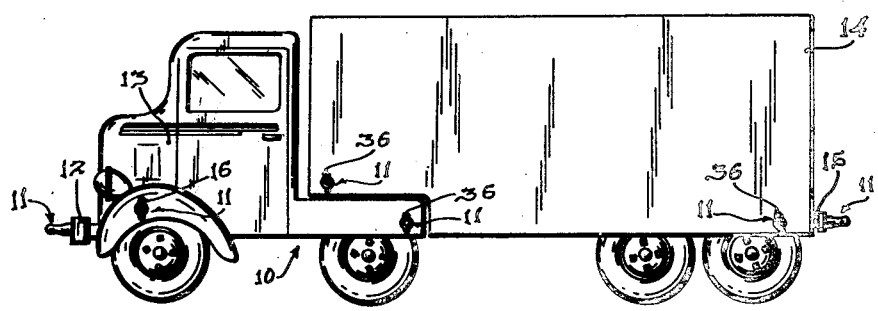
Fig. 1 is a side view of a trailer truck equipped with a plurality of clearance indicators in accordance with the present invention.

The present invention is shown applied, by way of example, in Fig. 1 to a trailer truck 10. There may be, for instance, two indicators as projections 11 from the front bumper 12, one such projection 11 at the rear of the power truck 13 at each side thereof, one such projection 11 at the forward end of the trailer 14 of the truck at each side of said trailer, one such projection 11 at the rear end of the trailer 14 at each side thereof, and two such projections 11 from the rear bumper 15 of the trailer. The indicators are similar as to construction but may be of different over-all lengths. For example, the indicators projected from the bumpers may be longer than the other indicators.

Figure 2:
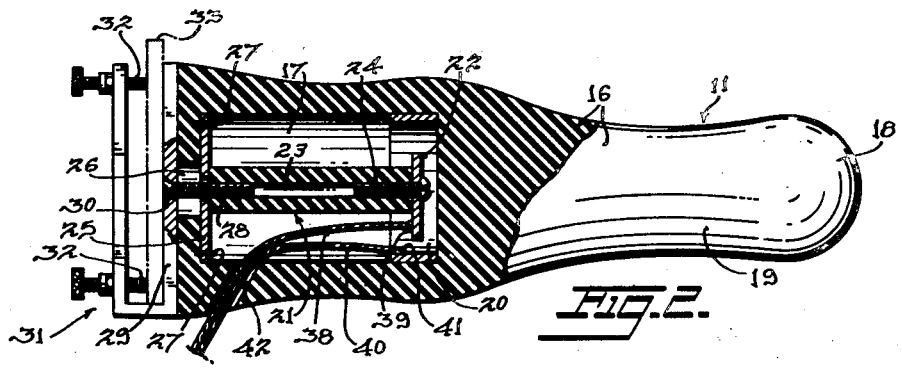
Fig. 2 is a side elevational view, partially in axial section, of one of the clearance indicators.
Figure 3:
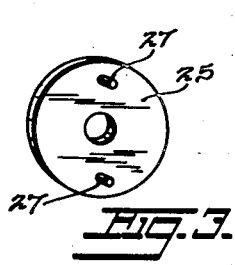
Fig. 3 shows in perspective one of the parts of the indicator.

Referring to Figs. 2 and 3, the indicator 11 as here illustrated is a structure comprising an elongated laterally elastically flexible housing 16. Said housing is shown as a unitary member made of rubber, and from end to end of circular cross-section. Within this housing is a cylindrical cavity 17 elongated in the direction of length of the housing. The housing 16 is tapered toward the outer end 18 thereof, beyond the outer end of the cavity 17. Desirably, the tapered end 18 is substantially spherically rounded and carried by a neck portion 19 somewhat slenderized intermediate its length.

Suitably snugly non-shiftably fitted into the outer end of the cavity 17 is an annular band or hoop 20 of conductive material. This constitutes one of the contacts of the normally open switch means in the appliance. The other contact of said switch means is carried at the outer end of a rod-like sub-structure 21, said contact being here shown as a disc 22 of conductive material.

The main body of the sub-structure 21 is a tube 23 of rubber, and said disc 22 is fixed on the outer end of the tube 23 by means of a screw 24 the threaded shank of which is passed in a central aperture through the disc 22 and thence self-tappingly into the bore of the tube 23. The inner end of the tube 23 rests flat against the outer face of a washer 25 of hard material, as one of metal.

This washer 25 is placed in the cavity 17 so as to have its rear face lie flat against the annular bottom of the cavity 17 which surrounds a cylindrical opening 26. Said washer 25 may be introduced into the cavity 17 in any suitable and convenient way, as by temporarily distorting the opening 26 to stretch the same to the requisite extent. The washer 25 is provided with a pair of pins 27 rigidly carried thereby, so that said pins may dig into the annular bottom of the cavity 17 to hold the washer against turning. The washer is held tight against the bottom of the cavity by endwise pressure from the tube 23 consequent upon a pull of the latter effected by a screw 28 sent through the aperture 26, then through the central opening of the washer 25 and thence self-tappingly into the bore of the tube 23.

The basal portion of the housing 16 opposite the inner end of the cavity 17 is squeezed flat and tight between the washer 25 and a plate-like portion 29 of a metal bracket of suitable design. Said bracket-portion 29 has a countersunk hole 30 therethrough, so that the shank of the screw 28 passes through said hole and the countersunk head of said screw seats itself flush in said hole.

With the parts thus coupled, the sub-structure 21, comprised mainly of the rubber tube 23, is securely held in the cavity 17 for projection toward the outer end thereof and with the said substructure normally extending coaxially with said cavity; while at the same time the appliance 11 is properly anchored for dependable projection from the bracket.

Said plate-like portion 29 is shown in Fig. 2 as part of a U-shaped bracket 31 carrying a pair of bolt-like set-studs 32 each provided with a nut and a lock nut as illustrated. These studs may be turned up tightly relative to a fixed part of the vehicle, as a bumper bar indicated in dot and dash lines at 33, and made fast by tightening up their nuts and lock nuts. Such a mounting of the device is shown at the extreme right and at the extreme left in Fig. 1.

Figure 4:
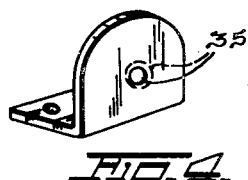
Fig. 4 is a similar view, showing a bracket modified from that indicated in Fig. 2 for providing a different mounting means for the indicator.

Referring to Fig. 4, a modified type of bracket 34 is shown, this being a substantially L-shaped one having a counter-sunk hole 35 therethrough corresponding to the hole 30.

Figure 5:
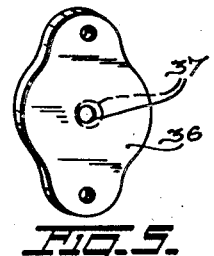
Fig. 5 is a similar view, showing still another bracket modification.

In Fig. 5, a form of bracket is shown which is a flat plate 36, having a countersunk hole 37 therethrough corresponding to the hole 30. This type of bracket is shown in Fig. 1 as mounting each of the indicators 11 projected laterally from the vehicle.

Considering again Fig. 2, a conductive wire 38 is connected, as by soldering as indicated at 39, to the disc 22, and a conductive wire 40 is connected, as by soldering as indicated at 41, to the band or hoop 20; these wires passing from the housing 16 near its inner end, as by way of an opening 42.

Figure 6:
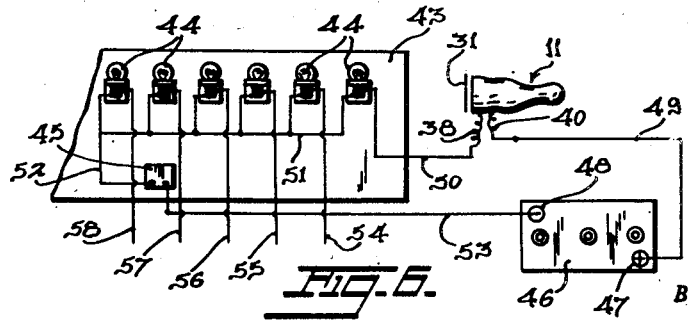
Fig. 6 is a schematic view, showing a plurality of signalling means, one an audible means and responsive to the closing of the switch of any of the indicators, and the others, visual signalling means, each being responsive to the closing of the switch of a particular indicator; this view also showing one of the indicators, a battery as a source of current on the vehicle, and a wiring diagram.

In Fig. 6 is indicated a panel 43, attached, say, to the dashboard of the truck. This panel has a row of electric light bulbs 44, equal in number to the number of indicators 11 with which the vehicle is equipped, and, in addition, a sound-emitting alarm means 45, as one of the buzzer type.

While there may be not only a special lamp 44, but also a separate buzzer or the like, for each of the appliances 11, here a single buzzer, said buzzer 45, is shown for being sounded whenever the switch of any indicator is closed.

A battery 46 is shown as the source of current for the circuit illustrated; such battery having the usual positive terminal 47 and the usual negative terminal 48. A lead 49 connects the terminal 47 with the wire 40 of the appliance 11 shown, and the wire 38 of that appliance is connected by a lead 50 to one terminal of the correlated lamp 44. The other terminal of said lamp is connected by leads 51 and 52 to one terminal of the buzzer 45, and the other terminal of said buzzer is connected by a lead 53 to the battery terminal 48.

Branched from the lead 49 are leads (not shown) each of which goes to one of the wires corresponding to the wires 40 of a different one of the other indicators 11 on the vehicle; and from the wire corresponding to the other of said wires 38 of each of said other indicators 11 a lead corresponding to the lead 50 goes, as indicated at 54, 55, 56, 57 and 58, to a different one of the lights 44 other than the one at the extreme right in Fig. 6. The other terminals of each of the lights 44 last-mentioned are by the leads shown tapped into the lead 51, and so, by way of said lead 51 and the lead 52, said lights 44 last-mentioned, together with the light at the extreme right in Fig. 6, are in series connection with the buzzer 45 and the battery 46.

Thus, when the normally open switch 20—22 in any of the indicators 11 is closed, the buzzer will sound, to call attention to the panel, and the particular lamp 44 simultaneously there lighted will indicate the particular indicator 11 the switch within which has been closed.

The operation of the device is as follows:

Assuming that the truck is passing through a corridor where there is little extra clearance and that it begins to crowd one wall, the indicator 11 at a side of the power truck at the forward end thereof will thus be pushed sidewise as it rubs up against the wall. The tube 23 will tend to remain straight, but the housing 16 will yield laterally to cause the disc 22 to touch the band or hoop 20, thereby sounding the buzzer and warning the truck driver that his vehicle is crowding at one side. The driver will then look at his dashboard and will see which lamp 44 is lighted, this lamp telling, by the wording adjacent to it on the dashboard which indicator 11 is being deflected, that is, at what point on the truck a collision is imminent.

The indicators 11 at the bumpers work in a similar manner to forewarn a collision with, in such a case also, the housing 16 deflecting laterally. Said housing then will be thus deflected, despite even a squarely endwise thrust thereagainst, since, the housing 16 being less readily endwisely compressible than longitudinally archable along the slenderized portion 19 thereof, said arching is initiated and followed instantaneously thereafter by a lateral flexing of the housing to a sufficient extent adjacent the outer end of the cavity 17 to cause the switch 20—22 to be closed at some one of a multiplicity of possible points circumferentially of the band or hoop 20.

From the above, it will be seen that each indicator 11 has universal switch-actuating motion, closing the circuit in response to sidewise movement of the band or hoop 20 in any direction, this occurring as above under even a direct axial compression. Furthermore, the entire construction is rugged, with the housing 16 so long-lived as to be substantially indestructible.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a circuit closer for use with a clearance indicator of a motor vehicle having an elongated flexible housing of insulation material and formed with an internal cavity, a washer positioned against the material of the housing at one end of the cavity, an annular band of conductive material fixedly mounted within the cavity at the end remote from said washer for connection in an electrical circuit, a tube of non-conductive material disposed concentrically within the cavity with one end abutting said washer and its other end terminating within said band but spaced from the material of the housing at the adjacent end of the cavity, a disc of conductive material mounted on the said other end of said tube for connection in the electrical circuit to complete the circuit when said band touches said disc, a bracket at the end of the housing adjacent said washer for mounting the housing on a desired portion of the vehicle leaving the other end of the housing free to be flexed to move the band into contact with said disc, and a screw passed through concentric openings formed in said bracket, the adjacent end of the housing, said washer and threadedly engaged into the bore of said tube securing said bracket, housing, washer and tube together as a unit and holding said tube in a proper position with said disc disposed concentrically within said annular band.

2. In a circuit closer for use with a clearance indicator of a motor vehicle having an elongated flexible housing of non-conductive material and formed with an internal cavity, a washer positioned against the material of the housing at one end of the cavity, an annular band of conductive material fixedly mounted within the cavity at the end remote from said washer for connection in an electrical circuit, a tube of non-conductive material disposed concentrically within the cavity with one end abutting said washer and its other end terminating within said band but spaced from the material of the housing at the adjacent end of the cavity, a disc of conductive material mounted on the said other end of said tube for connection in the electrical circuit to complete the circuit when said band touches said disc, a bracket at the end of the housing adjacent said washer for mounting the housing on a desired portion of the vehicle leaving the other end of the housing free to be flexed to move the band into contact with said disc, means securing said bracket, said washer and said tube together as a unit and to hold said tube in a proper position with said disc disposed concentrically within said annular band, and pins projecting from the face of said washer abutting the material of the housing at the end of the cavity to be pressed into the material of the housing by said securing means for holding said washer and associated parts against rotation relative to the housing.

FRED ELIASSEN.

REFERENCES CITED

The following references are of record in the file of this patent:

UNITED STATES PATENTS

| Number | Name | Date |
|---|---|---|
| 766,532 | Schmitt | Aug. 2, 1904 |
| 1,862,242 | Schwien | June 7, 1932 |
| 2,144,286 | Dawson | Jan. 17, 1939 |
| 2,208,697 | Kernodle et al. | July 23, 1940 |
| 2,270,687 | Morse | Jan. 20, 1942 |
| 2,452,768 | Kuster | Nov. 2, 1948 |